United States Patent Office 3,483,178
Patented Dec. 9, 1969

3,483,178
ESTERS, SALTS, AND ACIDS OF ORGANO-PHOSPHONO-AMINE OXIDES
Marvin M. Crutchfield, St. Louis, Mo., and Riyad R. Irani, Mentor, Ohio, assignors to Monsanto Company, St. Louis, Mo., a corporation of Delaware
No Drawing. Continuation-in-part of application Ser. No. 394,350, Sept. 3, 1964. This application Apr. 18, 1968, Ser. No. 722,161
Int. Cl. C07c 115/00; C07f 9/38
U.S. Cl. 260—140          9 Claims

ABSTRACT OF THE DISCLOSURE

Organo-phosphono-amine oxide compounds are described including acids having the formula $$\begin{array}{c} R_1 \diagdown \uparrow^O \phantom{-} \overset{X}{\underset{|}{}} \phantom{-} \overset{O}{\uparrow} \diagup^{OH} \\ N-C-P \\ R_2 \diagup \phantom{-} \overset{|}{Y} \phantom{-} \diagdown OH \end{array}$$

wherein $R_1$ and $R_2$ are each selected from the group consisting of alkyl, aryl, alkaryl, aralkyl, alicyclic, hydroxy-substituted derivatives of the foregoing, $$\begin{array}{c} X \phantom{-} \overset{O}{\uparrow} \diagup^{OH} \\ -C-P \\ \phantom{-} \overset{|}{Y} \phantom{-} \diagdown OH \end{array}$$

and $$-\left(\begin{matrix} X \\ | \\ C \\ | \\ Y \end{matrix}\right)_m \begin{matrix} (O)_p \\ \uparrow \\ -N-R_1 \\ | \\ R_2 \end{matrix}$$

wherein X and Y are each selected from the group consisting of hydrogen and lower alkyl, $m$ is an integer from 1 to 10, $p$ is an integer 0 to 1, and $R_1$ and $R_2$ each do not contain over 6 nitrogen atoms; and salts thereof such as salts of alkali metals, alkaline earth metals, aluminum, ammonium and amines; as well as processes for preparing the compound by reacting an oxidizing agent and an organo-phosphono-amine compound. The described amine oxide compounds are disclosed as finding utility in many and various fields which include their use as sequestering agents, additives in soap, detergents, shampoos and the like, as deflocculating agents for clays, drilling muds, paper pulps, inorganic and organic pigments.

---

The present case is a continuation-in-part of applicants' patent case, Ser. No. 394,350 filed Sept. 3, 1964, and now U.S. Patent No. 3,429,914, and should be considered in conjunction with said case, Ser. No. 394,350.

This invention relates to organo-phosphono-amine oxides and processes for preparing the same.

An object of this invention is to provide new and useful organo-phosphono-amine oxide compounds containing at least one $$\begin{array}{c} \diagdown \uparrow^O \phantom{-} \overset{|}{\underset{|}{}} \phantom{-} \overset{O}{\uparrow} \diagup^{O-} \\ N-C-P \\ \diagup \phantom{-} \overset{|}{} \phantom{-} \diagdown O- \end{array}$$

group per molecule.

A further object of this invention is to provide new and useful acids and salts of organo-phosphono-amine oxide compounds containing at least one $$\begin{array}{c} \diagup \overset{O}{\uparrow} \phantom{-} \overset{|}{\underset{|}{}} \phantom{-} \overset{O}{\uparrow} \diagup^{O-} \\ N-C-P \\ \diagdown \phantom{-} \overset{|}{} \phantom{-} \diagdown O- \end{array}$$

group per molecule.

A still further object of this invention is to provide a process for preparing organo-phosphono-amine oxide compounds.

Other objects of this invention will be apparent from a reading of the following description.

This invention is directed to new and useful organo-phosphono-amine oxide compounds selected from the group consisting of acids having the general formula (I)

$$\begin{array}{c} R_1 \diagdown \uparrow^O \phantom{-} \overset{X}{\underset{|}{}} \phantom{-} \overset{O}{\uparrow} \diagup^{OH} \\ N-C-P \\ R_2 \diagup \phantom{-} \overset{|}{Y} \phantom{-} \diagdown OH \end{array}$$

wherein: X and Y are each selected from the group consisting of hydrogen and lower alkyl (1–6 carbon atoms) and $R_1$ and $R_2$ are each selected from the group consisting of alkyl, aryl, alkaryl, aralkyl, alicyclic, hydroxy-substituted derivatives of the foregoing, $$\begin{array}{c} X \phantom{-} \overset{O}{\uparrow} \diagup^{OH} \\ -C-P \\ \phantom{-} \overset{|}{Y} \phantom{-} \diagdown OH \end{array}$$

and $$-\left(\begin{matrix} X \\ | \\ C \\ | \\ Y \end{matrix}\right)_m \begin{matrix} A \\ \uparrow \\ -N-R_1 \\ | \\ R_2 \end{matrix}$$

wherein: M is an integer from 1 to 10, A when present is oxygen, and $R_1$ and $R_2$ does not contain over 6 nitrogen atoms; and salts thereof selected from the group consisting of alkali metals, alkaline earth metals, aluminum, ammonium and amines.

When the symbols $R_1$ and $R_2$ represent groups containing carbon chains, such as alkyl group or groups containing alkyl moieties, i.e., aralkyl groups and the like, such carbon chains may be of a straight chain structure or a branched chain structure. Additionally, the carbon chains should preferably contain less than about 20 carbon atoms. For the symbols $R_1$ and $R_2$ when representing alicyclic groups such are preferably 5 and 6 membered mono-cyclic alicyclic groups. When the symbols $R_1$ and $R_2$ represent aryl groups and groups containing aryl moieties, i.e., alkaryl groups and the like, such groups are preferably mono-cyclic. Although the carbon atoms of the alkyl, alicyclic, aryl, alkaryl, aralkyl groups may contain many hydroxy substituents, for example, at least one hydroxy substituent per carbon atom in the group, it is preferred that such groups contain less than 1 hydroxy substituent per carbon atom in the group and more preferred for groups containing many carbon atoms, i.e., about 4 carbon atoms or more, less than about 3 hydroxy substituents per group. For most end use applications the compounds of the instant invention should preferably contain not more than about 25 carbon atoms associated with $R_1$ and $R_2$, and there are few, if any, end uses in which the foregoing groups contain more than a total of 50 carbon atoms.

In conjunction with the definitions of $R_1$ and $R_2$ above, the preferred substituents are the following:

(a) alkyl—containing from about 1 to about 18 carbon atoms;
(b) alkenyl—containing from about 1 to about 18 carbon atoms;
(c) aryl—phenyl, naphthyl, anthryl or phenanthryl;
(d) alkyl aryl (alkaryl)—hydroxy, halogen, lower alkyl, having from 1 to about 6 carbon atoms, and amino substituted phenyl, naphthyl, anthryl, or phenanthryl;
(e) cyclic—containing from about 4 to about 8 carbon atoms and there may be present in the ring either a nitrogen, sulfur, oxygen, or phosphorus atom; and (f) alicyclic—containing from about 4 to about 10 carbon atoms.

In conjunction with the number of nitrogen atoms contained in the amine oxide compound when in the acid form, it is preferred that the total number not exceed 6 nitrogen atoms, more preferably from about 1 to about 5 nitrogen atoms. As illustrative of the groups which $R_1$ and $R_2$ can be, there may be mentioned (a) tetrazolyl: $CHN_4$
(b) formimidoyl: $CH_2N$
(c) amidino: $CH_3N_2$
(d) guanidino: $CH_4N_3$
(e) cyano: $CN$
(f) triazolyl: $C_2H_2N_3$
(g) phenylimino: $C_6H_5N$
(h) phenylenebis (azo): $C_6H_4N_4$
(i) pyrrolyl: $C_4H_4N$
(j) anilino: $C_6H_6N$ When the amine oxide is in the ester form having the formula

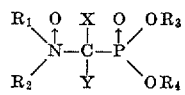

wherein $R_3$ and $R_4$ are from the group hydrogen and $R_1$ and $R_2$, as heretofore defined, it is preferred that said amine oxide not contain over (a total of) 10 nitrogen atoms, more preferably from about 1 to about 8 nitrogen atoms.

These compounds can be characterized quite generally as having at least one

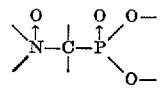

linkages in their molecules and are generically described in the specification by the general term organo-phosphono-amine oxides.

In general, the organo-phosphono-amine oxides can be prepared by the process of oxidizing organo-phosphono-amines with a suitable oxidizing agent. Suitable oxidizing agents are, in general, any oxidizing agent containing an O—O linkage (peroxide compound) and having an oxidizing action. In particular, suitable oxidizing agents include hydrogen peroxide, substituted peroxides and addition compounds of hydrogen peroxide, such as the peroxide of sodium and the super oxide of potassium, urea percompounds, perborates, persulfates and the peracids such as persulfuric acid, per acetic acid, peroxy monophosphoric acid and the like as well as their water-soluble salt compounds such as sodium, potassium, ammonium and organic amine salts, with hydrogen peroxide being particularly preferred. In general, the oxidation process can be carried out in an aqueous medium, i.e., an aqueous solvent or suspension, as well as in organic solvents such as alcohols, benzene and the like. Although excessive temperature conditions should be avoided due to the possible degradation of either the organo-phosphono-amine or organo-phosphono-amine oxide and/or the dangerous tendency of the oxidizing agent to decompose rapidly, ordinary or elevated temperatures i.e., from about 0 to 100° C. and even higher in some cases, can be used with temperatures from about 20 to 85° C. being preferred. Concentrations of the oxidizing agent in the reaction medium can vary considerably, however, it is preferred to use concentrations above about 10% by weight of the reaction medium with concentrations from about 20% to 50% by weight being particularly preferred. It should be noted that with compounds containing more than 1 nitrogen atom it is possible by varying the reaction conditions to either oxidize substantially all of the nitrogen atoms or only one nitrogen atom to the amine oxide form.

The salts of the organo-phosphono-amine oxides can be prepared by neutralization of the acids with a stoichiometric amount of a base or salt that contains essentially the desired cation or by conversion of the organo-phosphono-amine to a salt form prior to its oxidation to the amine oxide. Bases or salts of volatile acids such as those containing an alkali metal, alkaline earth metal, aluminum, ammonia and amines are especially suited. For example, to make a sodium salt, one of the free acids of the organo-phosphono-amine oxides can be neutralized with a stoichiometric amount of a base containing the sodium cation, such as NaOH, $Na_2CO_3$ and the like.

For the foregoing methods of preparation reaction conditions such as temperature, pH and time for reaction can be varied with the optimum conditions for the reactions readily ascertained by those skilled in the art. It has been found that a convenient method for determining favorable conditions in individual cases is provided by the $H^1$ and $P^{31}$ nuclear magnetic resonance (n.m.r.) signals which can be obtained from a small sample i.e., about 0.5 ml., of the reaction mixture. The formation of the semi-polar bond between nitrogen and oxygen as the reaction proceeds produces a change in the local magnetic environments of the hydrogen atoms on the carbon atoms adjacent to the N→O group as well as of the phosphorus atoms. As a result the n.m.r. signals which are observed for these atoms in the starting amine slowly disappear as the reaction proceeds, while simultaneously new and different signals are observed to appear for these atoms in the amine oxide reaction product. Observation of these signals can also serve to warn of extreme conditions of excessive time and/or temperature which can lead to additional undesired oxidation or even complete destruction of the product. Additionally, for starting materials which are appreciably water-soluble, such as tris(dihydrogen phosphonomethyl)amine, $N[CH_2PO_3H_2]_3$, the reaction is conveniently carried out in aqueous solution with the formation of water-soluble products which can be isolated by the evaporation of solvent and excess peroxide either under vacuum, or at atmospheric pressure. For starting materials which are not readily soluble in water, such as decyl, bis(dihydrogen phosphonomethyl) amine, $C_{10}H_{21}N[CH_2PO_3H_2]_2$, use of an organic solvent or conversion of the phosphono-acid group or groups to a soluble salt form is preferred to increase the aqueous solubility of the amine prior to reaction with the peroxide. For starting materials which are sparingly soluble in water or peroxide solution and which form amine oxides which are appreciably more water soluble, such as, tetrakis(dihydrogen phosphonomethyl)ethylene diamine,

the reaction can be preferably carried out by making an aqueous slurry of the starting material in peroxide solution with the slurry gradually turning to a homogeneous solution as the reaction proceeds. Reference to the specific examples presented hereinafter may be of further aid in order to assist in teaching the methods of their preparation.

The organo-phosphono-amines useful as starting materials to prepare the compounds of instant invention can be prepared by the reaction of a nitrogeneous material (ammonia, primary amines or secondary amines), a compound containing a carbonyl group (aldehyde or ketone) and orthophosphorous acid. Generally, by heating the mixture above about 50° C. at a relatively low pH, preferably about 2 or below, the extent of the reaction is usually completed in a few hours. Another method is the hydrolysis of the esters of the organo-phosphono-amines with concentrated HCl or HBr. Generally, by refluxing the ester and acid at reflux temperature for a period of a few hours is all that is required for the hydrolysis.

In general, the organo-phosphono-amine oxides of the present invention have utility in practically all fields of organic chemistry wherein their acidic or salt and/or amine oxide properties can be utilized.

In particular, the compounds of the instant invention can find utility in such fields as sequestering or chelating agents, water-treating agents, stabilizers for peroxy compounds, soap anti-oxidants, additives in liquid soap, detergents and shampoos, agents for use in scouring wool cloth and cotton kier boiling, metal cleaning compositions, rubber and plastic compositions and polymerization processes, bottle washing compositions, dairy cleaning compositions, agents for use in pulp and paper processing, corrosion inhibitors, feed and vegetation supplements, herbicides, insecticides, metal treating compositions, electroplating, detergent builders or additives, lime soap dispersants, surfactants, film formers in hair sprays and soluble packages, dispersants for clays, drilling muds, paper pulps, inorganic and organic pigments, and cement slurries, bactericide potentiators, hair modifiers in shampoos, fertilizers, food and beverage acidulants, leavening agents, cheese emulsifiers, modifying agents in evaporated and condensed milk, flame retardants in paints and plastics, oil additives, gasoline additives, dentifrice compositions and the like.

In particular, the acids and water-soluble salts of the tris(phosphono lower alkylidene) amine oxides were found to exhibit the property of being effective sequestering agents for metal ions in alkaline mediums. For example, the penta sodium salt of tris(dihydrogen phosphonomethyl)amine oxide was found to sequester $Ca^{++}$ ions in alkaline media in over a mole per mole basis ($Ca^{++}$ per sequestering agent). The acid compounds are of the following formula:

(2)
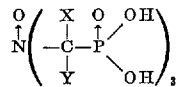

wherein X and Y are each selected from the group consisting of hydrogen and lower alkyl (1–4 carbon atoms). Although any water-soluble salt can be used, the preferred salts are the sodium salts and in particular the penta sodium salts although other alkali metal salts, such as potassium, lithium and the like, as well as mixtures of the alkali metal salts may be used.

In particular, the acids and water-soluble salts of the higher alkyl bis(phosphono lower alkylidene)amine oxides were found to exihibit the property of being effective surfactants and lime soap dispersants. The acid compounds are of the following formula:

(3)
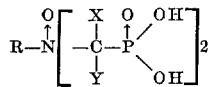

wherein X and Y are each selected from the group consisting of hydrogen and lower alkyl (1–4 carbon atoms) and R is an alkyl group containing from 4 to 20 carbon atoms. Although any water-soluble salt can be used, the preferred salts are the sodium salts and in particular the trisodium salts although other alkali metal salts, such as potassium, lithium and the like, as well as mixtures of the alkali metal salts may be used.

The following examples are presented to illustrate the invention, with parts and percentages by weight being used in the examples unless otherwise indicated.

EXAMPLE 1

In a suitable reaction vessel about 150 grams of tris-(dihydrogen phosphono methyl)amine is added to about 169 ml. of 30% $H_2O_2$ and the reaction mixture is stirred for about 12 hours at about 35° C. The reaction product is dried at about 25° C. under a stream of dry air. The product, after being washed with methanol and air dried, yields about 119 grams of tris(dihydrogen phosphono methyl)amine oxide, $ON(CH_2PO_3H_2)_3$. Elemental analysis yields the following results:

Found (percent): C, 11.39; H, 3.81; P, 29.39; N, 4.34; O, 51.07. Calculated: C, 11.44; H, 3.84; P, 29.50; N, 4.45; O, 50.78.

The equivalent weight of this product, by titration, is found to be about 317 which compares favorably with the calculated value of about 315. The $P^{31}$ and $H^1$ n.m.r. spectra are consistent with the formation of an

bond. The acid titration curve indicates that the acid dissociation constants of the product differ from those of the starting amine.

The sodium salt, bis(disodium phosphonomethyl) (monosodium hydrogen phosphonomethyl)amine oxide, $ON(CH_2PO_3NaH)(CH_2PO_3Na_2)_2$, is prepared by dissolving about 31.5 grams of the free acid obtained as in this example in about 50 grams of $H_2O_2$ and neutralizing by the addition of about 40.0 grams of 50% NaOH. The aqueous solution is evaporated to dryness under vacuum below 50° C.

The monocalcium salt, calcium tetrahydrogen tri(phosphonomethyl)amine oxide, $$ON(CH_2PO_3Ca)(CH_2PO_3H_2)_2$$

is prepared by dissolving about 31.5 grams of the free acid obtained as in this example in about 100 grams of water and precipitating by the slow addition of about 22.2 grams of 50% $CaCl_2$ solution. The calcium salt is filtered off, washed and air dried.

EXAMPLE 2

In a suitable reaction vessel about 22 grams of methyl, bis(dihydrogen phosphonomethyl)amine,

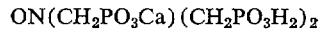

is added to about 34 grams of 30% $H_2O_2$ and stirred for about 1 to 2 hours at about 90° C. Analysis of the $P^{31}$ n.m.r. spectrum of the product, a viscous syrup, after being dried by evaporation under a stream of dry air at 25° C., indicates methyl, bis(dihydrogen phosphonomethyl)amine oxide, $CH_3N(O)(CH_2PO_3H_2)_2$.

The potassium salt, methyl, (dipotassium phosphonomethyl) (monopotassium hydrogen phosphonomethyl)-amine oxide, $CH_3N(O)(CH_2PO_3KH)(CH_2PO_3K_2)$, is prepared by dissolving about 21.9 grams of the free acid in about 33.6 grams of 50% KOH solution and evaporating the aqueous solution to dryness at about 50° C., under vacuum.

EXAMPLE 3

In a suitable reaction vessel about 31.3 grams of tris-(dihydrogen phosphono ethylidene)amine is added to about 22.3 grams of 30% $H_2O_2$ and the reaction mixture is stirred for about 20 hours at about 40° C. Evaporation at about 25° C. under a stream of dry air yields the amine oxide, tris(dihydrogen phosphono ethylidene) amine oxide, $N(O)(CH_3CHPO_3H_2)_3$.

The diammonium salt, bis(monoammonium hydrogen phosphono ethylidene) (dihydrogen phosphono ethylidene)amine oxide,

is prepared by dissolving about 10 grams of the free acid in about 20 grams of water, followed by the addition of concentrated $NH_3$ solution, until the pH of the mixture is about 3.5. The ammonium salt is then obtained by evaporation of the solvent under vacuum at about 25° C.

EXAMPLE 4

In a suitable reaction vessel about 13.9 grams of dimethyl, (dihydrogen phosphonomethyl)amine is added to about 22.3 grams of 30% $H_2O_2$ and the reaction mixture is stirred for about 48 hours at about 60° C. $H^1$ and $P^{31}$ n.m.r. spectra of the reaction mixture show reaction to form the amine oxide, dimethyl(dihydrogen phosphonomethyl)amine oxide, 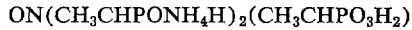

Addition of excess of a saturated solution of aluminum nitrate, Al(NO$_3$)$_3$, precipitates as a gelatinous solid [(CH$_3$)$_2$N(O)[CH$_2$PO$_2$(OH)]$_3$Al].

EXAMPLE 5

In a suitable reaction vessel about 29.3 grams of dodecyl, methyl(dihydrogen phosphono methyl)amine is neutralized with about 60 grams of 10% NaOH and about 22.3 grams of 30% H$_2$O$_2$ is added. The reaction mixture is stirred for about 40 hours at about 50° C. Excess hydrogen peroxide is destroyed at about 25° C. by the addition of a trace of catalase enzyme and the reaction mixture poured into cold excess concentrated HCl. The free acid, dodecyl, methyl (dihydrogen phosphonomethyl) amine oxide, (C$_{12}$H$_{25}$)(CH$_3$)N(O)[CH$_2$PO(OH)$_2$] precipitates and is separated by filtration. The solid product is washed with acetone and air dried.

A portion of the above acid is converted to the ammonium salt by dissolving in excess concentrated NH$_3$ solution and evaporating to dryness at 0° C. under vacuum. The product is dodecyl, methyl(monoammonium hydrogen phosphonomethyl)amine oxide.

EXAMPLE 6

Into a suitable reaction vessel about 100 grams of decyl, bis(dihydrogen phosphonomethyl) amine, about 47.5 grams of 50% NaOH and about 227 grams of H$_2$O are charged and heated to dissolve the acid. To this reaction mixture, about 39.5 grams of 50% H$_2$O$_2$ are added and this reaction mixture is heated to about 60° C. for about 10 hours. After cooling the solution to about 25° C., about 500 mg. of catalase is added to destroy the excess peroxide by standing for about 24 hours. A portion of this solution is added to excess concentrated HCl with a precipitate forming which is filtered, washed with acetone, and air dried. Analysis of the P$^{31}$ n.m.r. spectra of the product indicates decyl, bis(dihydrogen phosphonomethyl)amine oxide,

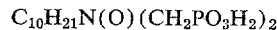

C$_{10}$H$_{21}$N(O)(CH$_2$PO$_3$H$_2$)$_2$

A portion of the acid product solution obtained as in this example is neutralized with 50% NaOH solution to a pH of about 10.5 and after drying by evaporation for several days at about 25° C. yields the sodium salt, decyl, (disodium phosphonomethyl) (monosodium hydrogen phosphonomethyl)amine oxide,

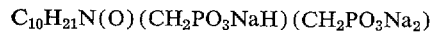

C$_{10}$H$_{21}$N(O)(CH$_2$PO$_3$NaH)(CH$_2$PO$_3$Na$_2$)

EXAMPLE 7

Into a suitable reaction vessel about 40.1 grams of tetradecyl, bis(dihydrogen phosphonomethyl)amine, about 24 grams of 50% NaOH and about 100 grams of H$_2$O are charged and heated to dissolve the acid. To this reaction mixture, about 19.4 grams of 50% H$_2$O$_2$ are added and this reaction mixture is heated to about 60° C. for about 24 hours. After cooling the solution to about 25° C., about 500 mg. of catalase enzyme is added to destroy the excess peroxide. A portion of this solution is added to excess concentrated HCl with a precipitate forming which is filtered, washed with acetone and air dried. The precipitated product is tetradecyl, bis(dihydrogen phosphonomethyl amine oxide,

C$_{14}$H$_{29}$N(O)[CH$_2$PO(OH)$_2$]$_2$

EXAMPLE 8

In a suitable reaction vessel about 43.6 grams of tetrakis(dihydrogen phosphonomethyl) ethylene diamine is slurried in about 68 grams of 30% H$_2$O$_2$ and stirred for about 24 hours at about 35° C. The reaction product, after being evaporated in air to remove excess solvent yields about 46 grams of solid material. Analysis of the P$^{31}$ n.m.r. spectra of the product indicates tetrakis (dihydrogen phosphonomethyl) ethylene diamine, N,N'-dioxide,

(H$_2$O$_3$PCH$_2$)$_2$NCH$_2$CH$_2$N(CH$_2$PO$_3$H$_2$)$_2$

A hexasodium salt is prepared by dissolving about 23 grams of the free acid in about 60 grams of 20% NaOH solution, followed by evaporation to dryness under vacuum at about 50° C.

A diamine salt is prepared by adding about 23 grams of the free acid to about 36.5 grams of a 20% solution of a n-butyl amine in water. On evaporation to dryness under vacuum

[—CH$_2$N(O)[CH$_2$PO$_3$H$_2$]$_2$]$_2$·2H$_2$NCH$_2$(CH$_2$)$_2$CH$_3$ is obtained as a sticky solid.

EXAMPLE 9

In a suitable reaction vessel about 24.9 grams of ethanol bis(dihydrogen phosphonomethyl)amine is added to about 22.3 grams of 30% H$_2$O$_2$ and stirred for about 24 hours at about 60° C. Evaporation at about 25° C. under vacuum yields the amine oxide, ethanol bis(dihydrogen phosphonomethyl) amine oxide (HOC$_2$H$_4$)N(O)[CH$_2$PO(OH)$_2$]$_2$ A mono-calcium salt is prepared by dissolving about 13 grams of the free acid in about 26 grams of H$_2$O, followed by the slow addition of about 27.5 grams of 20% CaCl$_2$ solution. Solid

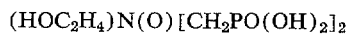

(HOC$_2$H$_4$)N(O)[CH$_2$PO(OH)$_2$][CH$_2$PO$_3$Ca]

precipitates, is filtered off, washed with water and dried.

EXAMPLE 10

In a suitable reaction vessel about 35.1 grams of ethanol, tetradecyl(dihydrogen phosphonomethyl) amine is neutralized with about 12.0 grams of 50% NaOH solution plus sufficient water to solubilize. About 22.3 grams of 30% H$_2$O$_2$ is added and the reaction mixture is stirred for about 48 hours at about 60° C. Excess H$_2$O$_2$ is destroyed and the reaction mixture poured into cold concentrated HCl. The free acid, ethanol, tetradecyl, (dihydrogen phosphonomethyl) amine oxide, (HOC$_2$H$_4$)(C$_{14}$H$_{29}$)N(O)[CH$_2$PO(OH)$_2$]

precipitates and is removed by filtration. The product is washed with water and air dried.

About 18.8 grams of the free acid is dissolved in about 56 grams of a 5% KOH solution which is subsequently evaporated to dryness under vacuum to yield the monopotassium salt

(HOC$_2$H$_4$)(C$_{14}$H$_{29}$)N(O)[CH$_2$PO(OH)$_2$][CH$_2$PO(OH)K]

EXAMPLE 11

In a suitable reaction vessel about 45.0 grams of tetrakis (dihydrogen phosphonomethyl) trimethylene diamine is slurried in about 68 ml. of 30% H$_2$O$_2$ and stirred for about 24 hours at about 35° C. The reaction product, after being air dried at about 25° C. to remove excess solvent yields about 47 grams of solid tetrakis (dihydrogen phosphonomethyl) trimethylene diamine, N,N' dioxide,

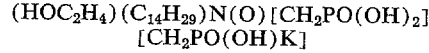

(H$_2$O$_3$PCH$_2$)$_2$N—CH$_2$—CH$_2$—CH$_2$—N(CH$_2$PO$_3$H$_2$)$_2$

EXAMPLE 12

In a suitable reaction vessel about 57.3 grams of pentakis (dihydrogen phosphonomethyl) diethylene triamine is slurried in about 68 grams of 30% H$_2$O$_2$ and stirred for about 48 hours at 35° C. The reaction product, after evaporation of excess solvent, yields pentakis (dihydrogen phosphonomethyl) diethylene triamine, N,N', N" trioxide.

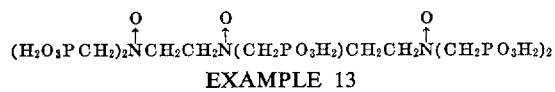

EXAMPLE 13

In a suitable reaction vessel about 46 grams of bis (dihydrogen phosphonomethyl), bis(dihydrogen phosphono isopropylidene)ethylene diamine is slurried in about 68 grams of 30% $H_2O_2$ and stirred for about 48 hours at about 35° C. The reaction product is then evaporated to dryness at about 25° C. under vacuum to yield solid bis(dihydrogen phosphonomethyl), bis(dihydrogen isopropylidene)ethylene diamine, N,N, dioxide.

EXAMPLE 14

In a suitable reaction vessel about 34.6 grams of n-hexyl, bis(dihydrogen phosphono isopropylidene)amine is dissolved in about 120 grams of 10% NaOH and about 22.3 grams of 30% $H_2O_2$ is added thereto. The solution is heated at about 60° C. for about 12 hours. Excess solvent is removed by vacuum evaporation to yield the salt,

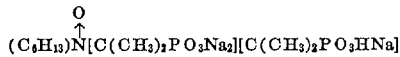

EXAMPLE 15

In a suitable reaction vessel about 28.1 grams of phenyl bis(dihydrogen phosphonomethyl)amine is slurried with about 22.3 grams of 30% $H_2O_2$ and heated at about 50° C. for about 24 hours with efficient stirring. Excess water and peroxide are removed by vacuum evaporation to yield phenyl bis(dihydrogen phosphonomethyl)amine oxide,

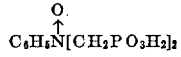

EXAMPLE 16

In a suitable reaction vessel about 28.7 grams of cyclohexyl, bis(dihydrogen phosphonomethyl)amine is slurried with about 34 grams of 30% $H_2O_2$ and heated to about 50° C. for about 24 hours with efficient stirring. Vacuum evaporation of excess water and $H_2O_2$ yield cyclohexyl, bis(dihydrogen phosphonomethyl)amine oxide,

Other compounds of the instant invention which can be prepared according to the procedures as illustrated by the foregoing examples include the following:

(1) N - (2 - hydroxyethyl), tri(dihydrogen phosphono methyl)ethylene diamine N,N'-dioxide

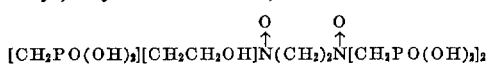

(2) tetrakis(dihydrogen phosphono methyl) hexamethylene diamine, N,N'-dioxide

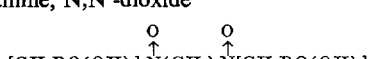

(3) tetrakis(dihydrogen phosphono methyl) heptamethylene diamine N,N'-dioxide

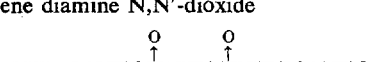

(4) tetrakis(dihydrogen phosphono methyl) dodecamethylene diamine, N,N'-dioxide

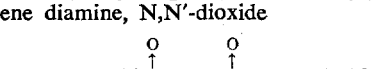

(5) N - (2 - hydroxyethyl)bis(dihydrogen phosphono methyl) amine, N,N'-dioxide

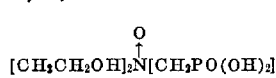

(6) methyl, ethanol, (dihydrogen phosphono methyl) amine oxide

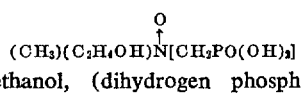

(7) ethyl, ethanol, (dihydrogen phosphono methyl) amine oxide

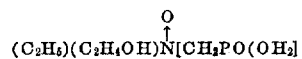

(8) hexakis(dihydrogen phosphono methyl) triethylene tetramine, N,N',N",N'''-tetraoxide

(9) heptakis (dihydrogen phosphono methyl) tetraethylene pentamine N,N',N",N''',N''''-pentaoxide

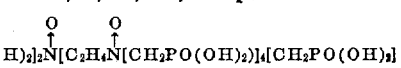

(10) tetrakis(dihydrogen phosphono methyl) propylene diamine, N,N'-dioxide

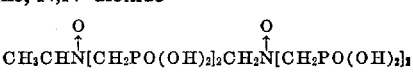

(11) pentakis (dihydrogen phosphono methyl) dipropyl triamine, N,N',N"-trioxide

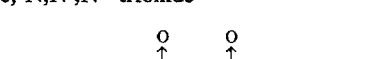

(12) tetrakis(dihydrogen phosphono methyl)1,3-butane diamine, N,N'-dioxide

(13) butyl, ethanol, (dihydrogen phosphono methyl) amine oxide

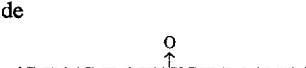

(14) dibutyl(dihydrogen phosphono methyl) amine oxide

(15) octyl, ethanol (dihydrogen phosphono methyl) amine oxide

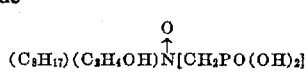

(16) butyl, isopropanol(dihydrogen phosphono methyl) amine oxide

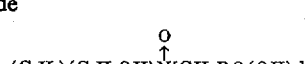

(17) disopropyl(dihydrogen phosphono methyl) amine oxide

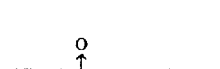

(18) n-oleyl bis(dihydrogen phosphono methyl) amine oxide

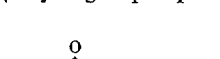

(19) n-hexyl bis(dihydrogen phosphono methyl) amine oxide

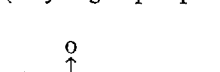

(20) bis(dihydrogen phosphono methyl) (dihydrogen phosphono butylidene) amine oxide $$\overset{O}{\underset{\uparrow}{N}}[CH_2O(OH)_2]_2[C(C_3H_7)O(OH)_2]$$

(21) tris hydroxy methyl bis(dihydrogen phosphono methyl) amine oxide $$(CH_2OH)_3C\overset{O}{\underset{\uparrow}{N}}[CH_2O(OH)_2]_2$$

(22) tetrakis(dihydrogen phosphono methyl) 1,2-propane diamine-N,N'-dioxide $$CH_3C[\overset{O}{\underset{\uparrow}{N}}(CH_2PO(OH)_2)_2]CH_2\overset{O}{\underset{\uparrow}{N}}[CH_2PO(OH)_2]_2$$

(23) diethyl(dihydrogen phosphono methyl) amine oxide $$(C_2H_5)_2\overset{O}{\underset{\uparrow}{N}}[CH_2PO(OH)_2]$$

(24) methyl, hexyl, (dihydrogen phosphono methyl) amine oxide $$(CH_3)(C_6H_{13})\overset{O}{\underset{\uparrow}{N}}[CH_2PO(OH)_2]$$

(25) didodecyl(dihydrogen phosphono methyl) amine oxide $$(C_{12}H_{25})_2\overset{O}{\underset{\uparrow}{N}}[CH_2PO(OH)_2]$$

(26) dodecyl, ethanol, (dihydrogen phosphono methyl) amine oxide $$(C_{12}H_{25})(C_2H_4OH)\overset{O}{\underset{\uparrow}{N}}[CH_2PO(OH)_2]$$

(27) dihexyl (dihydrogen phosphono methyl) amine oxide $$(C_6H_{13})_2\overset{O}{\underset{\uparrow}{N}}[CH_2PO(OH)_2]$$

(28) diphenyl (dihydrogen phosphono methyl) amine oxide $$(C_6H_5)_2\overset{O}{\underset{\uparrow}{N}}(CH_2PO_3H_2)$$

(29) benzyl bis(dihydrogen phosphono methyl) amine oxide $$(C_7H_7)_2\overset{O}{\underset{\uparrow}{N}}[CH_2PO_3H_2]_2$$

(30) tetradecylphenyl bis(dihydrogen phosphono methyl) amine oxide $$C_{14}H_{29}-C_6H_4\overset{O}{\underset{\uparrow}{N}}[CH_2PO_3H_2]_2$$

(31) methyl, cyclohexyl (dihydrogen phosphono methyl) amine oxide $$CH_3(C_6H_{11})\overset{O}{\underset{\uparrow}{N}}[CH_2PO_3H_2]$$

(32) ethyl, cyclopentyl (dihydrogen phosphono methyl) amine oxide $$C_2H_5(C_5H_9)\overset{O}{\underset{\uparrow}{N}}[CH_2PO_3H_2]$$

(33) hexylphenyl bis(dihydrogen phosphono methyl) amine oxide $$C_6H_{13}-C_6H_4\overset{O}{\underset{\uparrow}{N}}[CH_2PO_3H_2]_2$$

(34) xylyl bis(dihydrogen phosphono methyl) amino oxide $$(CH_3)_2C_6H_3\overset{O}{\underset{\uparrow}{N}}[CH_2PO_3H_2]_2$$

Other bases or salts which can be reacted with the free acids to produce salt compounds of the instant invention according to the procedures as illustrated by the foregoing examples include the inorganic alkali metal, alkaline earth metal and aluminum salts, oxides and hydroxides, such as, NaCl, NaNO$_3$, Na$_2$O, NaCO$_3$, NaHCO$_3$, KOH, K$_2$O, KCl, K$_2$CO$_3$, KNO$_3$, LiOH, LiCl, LiNO$_3$, Li$_2$CO$_3$, CaOH, CaCl, CaNO$_3$, Ca$_2$CO$_3$, CaCl$_2$, CaO, CaCO$_3$, MgCl$_2$, MgCO$_3$, BaCO$_3$, BaCl$_2$, Ba(OH)$_2$, SrCO$_3$, SrCl$_2$, Sr(OH)$_2$, Al(OH)$_3$, Al$_2$O$_3$, Al(NO$_3$)$_3$, and amines, particularly low molecular weight amines, i.e., having a molecular weight below about 300, and more particularly the alkyl amines, alkylene amines and alkanol amines containing not more than 2 amine groups, such as, ethyl, diethylamine, propyl amine, propylene diamine, hexyl amine, 2-ethyl hexyl amine, N-butyl ethanol amine, triethanol amine and the like.

EXAMPLE 17

In a suitable reaction vessel about 29.8 grams of 1-hydroxy-phenyl bis(dihydrogen phosphonomethyl) amine is slurried with about 25 grams of 30% H$_2$O$_2$ and heated at about 54° C. for about 18 hours with frequent agitation. Excess water and peroxide are removed by vacuum evaporation to yield 1-hydroxy phenyl bis(dihydrogen phosphonomethyl) amine oxide, $$HOC_6H_4\overset{O}{\underset{\uparrow}{N}}[CH_2PO_3H_2]_2$$

EXAMPLE 18

The procedure set forth in Example 17 was repeated with the exception that 1-chloro-phenyl bis(dihydrogen phosphonomethyl) amine was utilized in place of the phenol-amine. The resulting product was chlorophenyl bis(dihydrogen phosphonomethyl) amine oxide.

$$C_6H_4Cl\overset{O}{\underset{\uparrow}{N}}[CH_2PO_3H_2]_2$$

EXAMPLE 19

The procedure set forth in Example 17 was repeated with the exeception that phenylene bis (azo) bis (dihydrogen phosphonomethyl) amine was substituted for the phenol-amine. The resulting product was phenylene bis (azo) bis (dihydrogen phosphonomethyl) amine oxide. The aluminum, sodium, calcium and potassium salts of this amine oxide were then respectively prepared by adding to separate portions of said amine oxide, excess amounts, respectively, of aluminum nitrate, sodium hydroxide, calcium nitrate, and potassium hydroxide.

EXAMPLE 20

In a suitable reaction vessel about 31 grams of 1-hydroxy phenyl bis (diethyl phosphonomethyl) amine is added to about 26 grams of 30% H$_2$O$_2$ and stirred for about 19 hours at about 58° C. Evaporation at about 25° C. under vacuum yields the ester form of the amine oxide compound, 1 hydroxy phenyl bis (diethyl phosphonomethyl) amine oxide, (HOC$_6$H$_4$)N(O)[CH$_2$PO(OC$_2$H$_5$)$_2$]$_2$

What is claimed is:
1. An organo-phosphono-amine oxide compound selected from the group consisting of acids having the formula

$$\begin{array}{c} R_1 \quad O \quad X \quad O \quad OH \\ \underset{\uparrow}{\diagdown} \quad | \quad \underset{\uparrow}{\diagup} \\ N-C-P \\ \diagup \quad | \quad \diagdown \\ R_2 \quad Y \quad OH \end{array}$$

wherein each of R$_1$ and R$_2$ is selected from the group consisting of tetrazolyl, formimidoyl, amidino, guanidino, cyano, triazolyl, phenylimino, phenylene bis azo, pyrrolyl and anilino, wherein X and Y are each selected from the group consisting of hydrogen and lower alkyl, and the amine oxide compound does not contain over 5 nitrogen atoms when in the acid form; salts thereof selected from the group consisting of alkali metals, alkaline earth metals, aluminum, ammonium and amines which have a molecular weight below about 300 and selected from the group consisting of alkyl amines, alkylene amines and alkanol amines; and esters thereof having the formula

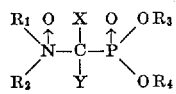

wherein $R_3$ and $R_4$ are each selected from the group consisting of hydrogen, alkyl, and $R_1$ and $R_2$ heretofore defined, with the proviso that $R_3$ and $R_4$ are not hydrogen at the same time.

2. An organo-phosphono-amine oxide compound selected from the group consisting of acids having the formula

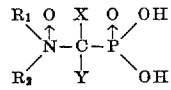

wherein $R_1$ and $R_2$ are each selected from the group consisting of (a) aryl selected from the group consisting of phenyl, naphthyl, anthryl, or phenanthryl, (b) alkaryl selected from the group consisting of hydroxy, halogen, lower alkyl having from 1 to 6 carbon atoms and amino substituted phenyl, naphthyl, anthryl or phenanthryl and (c) alicyclic containing from 4 to 10 carbon atoms, wherein X and Y are each selected from the group consisting of hydrogen and lower alkyl, and the amine oxide compound does not contain over 5 nitrogen atoms when in the acid form; salts thereof selected from the group consisting of alkali metals, alkaline earth metals, aluminum, ammonium, and amines which have a molecular weight below about 300 and selected from the group consisting of alkyl amines, alkylene amines and alkanol amines containing not more than 2 amine groups; and esters thereof having the formula

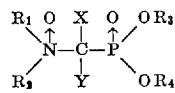

wherein $R_3$ and $R_4$ are each selected from the group consisting of hydrogen, alkyl, and $R_1$ and $R_2$ heretofore defined, with the proviso that $R_3$ and $R_4$ are not hydrogen at the same time.

3. An organo-phosphono-amine oxide having the formula

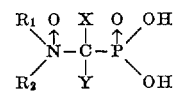

wherein X and Y are each selected from the group consisting of hydrogen and lower alkyl and $R_1$ and $R_2$ are each selected from the group consisting of phenyl substituted by hydroxy, chloro, bromo, and amino.

4. An ester compound of an organo-phosphono-amine oxide having the formula

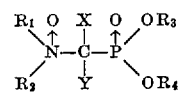

wherein $R_1$ and $R_2$ are each selected from the group consisting of (a) aryl selected from the group consisting of phenyl, naphthyl, anthryl, or phenanthryl, (b) alkaryl selected from the group consisting of hydroxy, halogen, lower alkyl having from 1 to 6 carbon atoms and amino substituted phenyl, naphthyl, anthryl or phenanthryl and (c) alicyclic containing from 4 to 10 carbon atoms, wherein X and Y are each selected from the group consisting of hydrogen and lower alkyl; $R_3$ and $R_4$ are each selected from the group consisting of hydrogen, alkyl, and $R_1$ and $R_2$, heretofore defined, with the proviso that $R_3$ and $R_4$ are not hydrogen at the same time; and the amine oxide does not contain over 10 nitrogen atoms.

5. A salt compound of an organo-phosphono-amine oxide having the formula

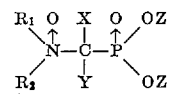

wherein $R_1$ and $R_2$ are each selected from the group consisting of (a) aryl selected from the group consisting of phenyl, naphthyl, anthryl, or phenanthryl, (b) alkaryl selected from the group consisting of hydroxy, halogen, lower alkyl having from 1 to 6 carbon atoms and amino substituted phenyl, naphthyl, anthryl or phenanthryl and (c) alicyclic containing from 4 to 10 carbon atoms, wherein X and Y are each selected from the group consisting of hydrogen and lower alkyl, the amine oxide compound does not contain over 5 nitrogen atoms, and Z is selected from the group consisting of hydrogen and cations selected from the group consisting of alkali metals, alkaline earth metals, aluminum and amines which have a molecular weight below about 300 and selected from the group consisting of alkyl amines, alkylene amines and alkanol amines containing not more than 2 amine groups, with at least one group represented by Z being said cation.

6. 1-hydroxy phenyl bis(dihydrogen phosphonomethyl) amine oxide.

7. 1-chlorophenyl bis(dihydrogen phosphonomethyl) amine oxide.

8. Phenylene bis(azo) bis(dihydrogen phosphonomethyl)amine oxide.

9. 1-hydroxy phenyl bis(diethyl phosphonomethyl) amine oxide.

References Cited

UNITED STATES PATENTS

| | | | |
|---|---|---|---|
| 2,635,112 | 4/1953 | Fields | 260—945 XR |
| 2,847,442 | 8/1958 | Sallmann | 260—945 XR |
| 2,917,528 | 12/1959 | Ramsey et al. | 260—502.5 XR |
| 3,234,124 | 2/1966 | Irani | 260—502.5 XR |
| 3,288,846 | 11/1966 | Irani et al. | 260—502.5 |
| 3,298,956 | 1/1967 | Irani et al. | 260—502.5 XR |
| 3,352,948 | 11/1967 | Kawahara et al. | 260—945 XR |
| 3,359,266 | 12/1967 | Maier | 260—502.5 XR |
| 2,169,976 | 8/1939 | Guenther et al. | 260—583 XR |
| 2,586,238 | 2/1952 | Lytton | 260—583 XR |
| 2,871,229 | 1/1959 | Price | 260—583 XR |
| 3,047,579 | 7/1962 | Witman | 260—583 XR |
| 3,098,794 | 7/1963 | Dohr et al. | 260—583 XR |
| 3,202,714 | 8/1965 | Zimmerman | 260—584 |
| 3,206,512 | 9/1965 | Koebner et al. | 260—583 XR |

FLOYD D. HIGEL, Primary Examiner

U.S. Cl. X.R.

44—63, 64, 72, 67; 71—86; 75—2; 106—288; 117—136; 252—392, 357, 49.9, 8.1, 358, 117, 171, 136, 139; 260—945, 502.5, 448, 308, 326.85, 999, 329, 501.19, 501.2, 501.21; 424—70